Feb. 6, 1934.　　　　H. GÖRG　　　　1,946,158
CLAMPING CHUCK FOR TOOLS
Filed Aug. 8, 1928
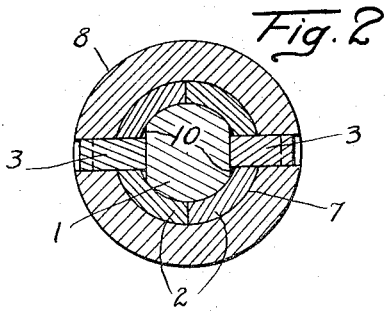
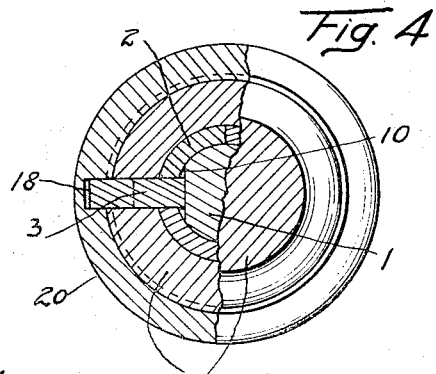
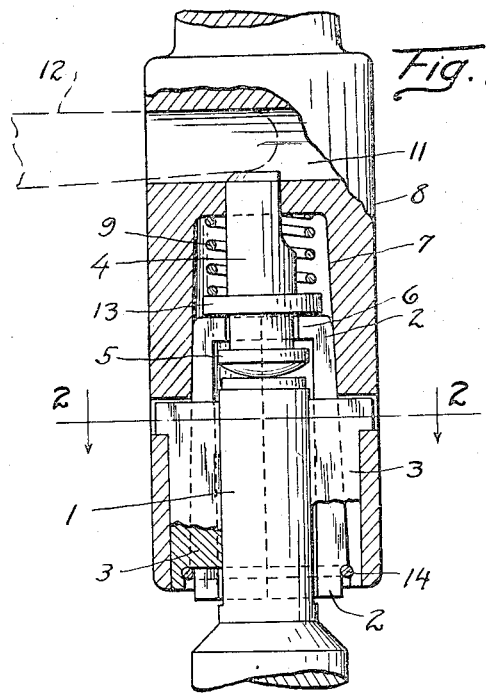
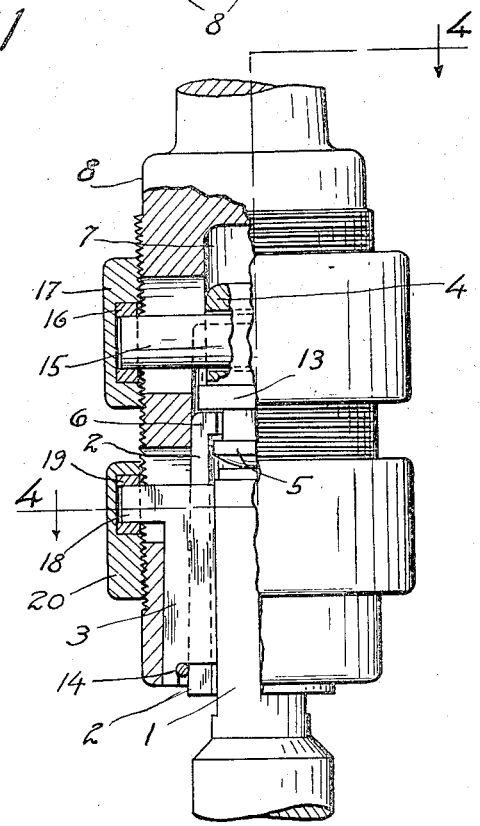
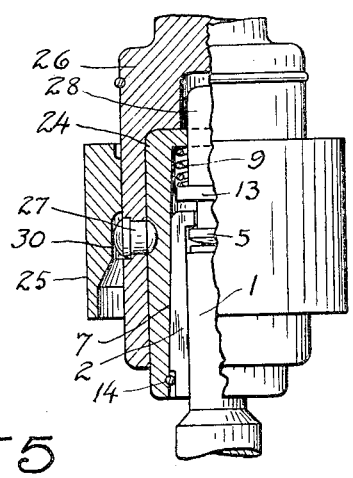
INVENTOR.
Heinrich Görg
BY Parker & Burton
ATTORNEYS.

Patented Feb. 6, 1934

1,946,158

UNITED STATES PATENT OFFICE 1,946,158

CLAMPING CHUCK FOR TOOLS

Heinrich Görg, Detroit, Mich.

Application August 8, 1928, Serial No. 298,369, and in Germany April 23, 1928

15 Claims. (Cl. 279—55)

My invention relates to a clamping chuck for tools and consists materially firstly of a transmission sleeve composed of any desired number of segmental pieces shiftable along their longitudinal axis, and secondly, of a bolt provided with collars contacting with upper nose-like projections of said segmental pieces and serving for shifting them, or the entire sleeve respectively.

There exist already numerous devices for the clamping fast of tools having cylindrical shafts. The clamping is effected in a variety of ways; oftentimes, for instance, after the tool shaft has been introduced into the bore of a grip chuck having either only one, or more than one, slot and being provided exteriorly with a steep cone that chuck is drawn into a counter-member by means of a screw-cap, whereby the grip chuck is compressed and the tool shaft clamped fast in it. When the screw-cap is loosened, the grip chuck is pressed back by the steep cone whereby also the tool shaft is loosened. Also cylindrical and conical clamping sleeves having either only one, or more than one, slot and being able to hold fast a tool shaft by being compressed have been used. In some cases flat clamping pieces guided in corresponding grooves of an intermediate body and sliding exteriorly along conical faces have been provided for the purpose of holding fast tool shafts. The clamping fast is, however, very imperfect in the majority of cases, in consequence whereof frequently a sliding movement of the tool shaft and the gripping jaws, or the clamping sleeve, relatively to one another arises and these parts are subjected to great wear and tear. Devices of this kind are suited, therefore, only for the transmission of small powers and can be used advantageously only in connection with small machine tools. They are decidedly unsuited for use in connection with twist drills, countersinks, milling-cutters and the like.

Hitherto where it has been found necessary to transmit any great degree of power to the tool through a tool shank the said tool shank has been tapered to form a thin tang. When the tool was inserted in the tool chuck this tang fell between two cross bars and thus a positive drive was furnished the tool shank through the connection between the cross bars and the tang. This particular method of providing a positive power transmission from tool chuck to tool involved serious disadvantages, the chief one of which was that when any undue resistance was offered by the work in which the tool was engaged, the tang portion of the tool shank was very apt to snap off and necessitate a cessation of the work in order to replace the broken tool.

All drawbacks from which the above-mentioned known devices suffer are obviated in and by the present invention, the chief members of which are formed, firstly, by a transmission sleeve composed of any desired number of segmental pieces each of which is provided with a conical outer face and parallel cylindrical inner surface, and being shiftable longitudinally towards and against a conical member; secondly, of two members having flat parallel inner faces located opposite one another between said segmental pieces, and thirdly, a bolt having collars contacting with nose-like projections of the said segmental pieces and affecting the longitudinal shifting of the entire sleeve.

Extended experiments have proved that the clamping in of the tools by means of this chuck proceeds in a very reliable, also simple, manner without doing any damage to any part. The improved clamping chuck permits the manufacture of high efficiency tools, with cylindrical shafts, at considerably lower costs than heretofore.

The invention is illustrated diagrammatically and by way of example in the accompanying drawing wherein:

Figure 1 is a longitudinal cross sectional view, partially cut away, illustrating one embodiment of the invention, Figure 2 is a cross sectional view along line 2—2 of Figure 1, Figure 3 is partly a longitudinal sectional view and a side view of another embodiment of this invention, Figure 4 is partially a cross sectional view and a top view along line 4—4 of Figure 3, and Figure 5 is a longitudinal view, partially in section of an embodiment of this invention showing another manner for securing the tool within the chuck.

Referring to Figure 1, 8 denotes the body of the clamping chuck, and 7 is a large conical bore in this body. Correspondingly shaped segmental pieces 2 are inserted into said bore. These segmental pieces, as hitherto stated, are provided with conical outer surfaces which fit snugly into the conical recess of the chuck body and slide therein. The inner surfaces of these segments form parallel cylindrical faces. Thus it is obvious that as the segmental pieces slide axially in the recess of the chuck body the inner faces of these segments gradually move radially inwardly and function to clamp the tool shank about its entire circumference and throughout a substantial portion of its length. The inner end of each of these pieces is provided with a nose-like projection 6 which engages an annular groove formed by two collars 5 and 13 of a bolt 4, the rear or inner end of which extends into a recess 11 of the body 8. A cylindrical spring 9 inserted into the inner end of the bore 7 tends constantly to move the bolt 4 outwardly by the intermediary of the collar 13.

1 denotes the shaft of the respective tool. This shaft is chiefly cylindrical, but flattened at two side portions 10 which lie counter to one another as shown in Figures 2 and 4. Each of these portions is adapted to contact with a wedge 3. These wedge members are mounted in slots in the wall of the chuck body recess and project radially inwardly through spaces provided between the segmental pieces 2. In the modification disclosed in Figure 1 this wedge member is provided with a nose which fits into an aperture in the chuck body, thus preventing axial sliding movement of the wedge member. Also, in the particular modification disclosed in Figure 1, the inner flat face forms a chord with respect to the inner surface of the conical segmental members 2 and extends slightly further inward in a radial direction than the segmental members 2. The outer longitudinal face of wedge member 3 in Figure 1 is parallel to its inner face. The modification disclosed in Figure 3 distinguishes from that disclosed in Figure 1, insofar as the wedge members are concerned, only in that the said wedge member is axially slidable along the recess of the chuck body and has a tapered outer face. Thus when the member is slid longitudinally its outer tapered face, contacting with the reversely tapered longitudinal wall of the slot in which the member is mounted, forces the wedge member radially inwardly. The inner end of the tool shaft 1 touches the vaulted end of the bolt. When the tool shaft 1 is further moved inwardly, it shifts the bolt 4 in the direction of the recess 11 of the body 8, and the collar 5 of the bolt draws the segmental pieces 2 along with it, whereby, owing to the conical shape of the bore 7, said pieces are moved radially inwards, and clamp the tool shaft fast between them. In this way the tool shank is gripped firmly around its entire cylindrical surface and throughout a substantial portion of its length, providing a very powerful clamping engagement for transmission of power from the tool chuck to the tool itself. The spring 9 had been depressed by the collar 13 of the bolt 4 when this latter was shifted inwardly by the tool shaft 1.

Normally, that is to say, as long as the torsional strain to which the tool, for instance a twist-drill, is subjected, when in operation, is of normal magnitude, the power is transmitted to the tool by the intermediary of the segmental pieces which form the transmission sleeve mentioned; but if the work to be done requires a greater expenditure of power, the wedges 3 also become operative and transmit the power directly from the chuck body to the tool shaft and sliding displacement of the tool in the transmission sleeve, as well as of this sleeve in the chuck body, is completely prevented.

In order to disconnect the tool shaft from the chuck body, the expelling member 12 (indicated by dotted lines) is inserted into the recess 11 of the chuck body shaft to unseat the latter and thereby shift in turn the segmental pieces 2, this shifting being assisted and finally completed by the spring 9. The downward movement of the segmental pieces is limited by a ring 14 inserted into an annular recess of the chuck body, as shown.

The segmental pieces 2 and the bolt 4 can be shifted also by other means, for instance by means of a transverse member 15 (Figure 3, lefthand half, upper part) the projecting ends of which engage a sliding ring 16 encompassed by a threaded sleeve 17 coupled by its thread with the correspondingly threaded chuck body. When this sleeve is turned in the one or the other direction it takes the transverse member 15 with it and moves it longitudinally either forward or away from the tool shaft 1 whereby this latter is either released or clamped fast. The co-operation of the tool shaft with the segmental pieces, and the co-operation of these pieces with the conical bore of the chuck body is broadly the same as in Figure 1.

It is also shown in Figure 3 (lefthand half, lower part) how the wedges 3 can be shifted by members like the members 16 and 17 mentioned in the preceding paragraph. Outwardly projecting lugs 18 of the wedges 3 engage a sliding ring 19 encompassed by a threaded ring 20 which can be screwed and turned upwardly and downwardly just as the ring 17, and takes then with it the wedges 3 in the corresponding direction. As previously described the outer face of the wedge member 3 in this modification is tapered in order that the wedge member may engage the tapered wall of the slot in which the member is mounted when the tool is moved axially into the chuck. When the wedge member contacts the inner wall of its slot it is moved radially inward and grips the flat portion of the tool shank in a manner similar to the gripping of the cylindrical portions of the tool shank by the segmental members 2.

The chuck is not only provided with a single powerful clamping means in the members 2, but also a secondary means which positively prevents rotation of the tool shank within the chuck recess when the torque being transmitted through the shank is very great. In the modification disclosed in Figure 1 the wedge members 3 are designed to loosely engage the flattened portions of the cylindrical tool shank. In this way they function as a supplemental means only in case there is a tendency for the shank to rotate with the segmental sleeve members 2. However, in Figure 3 I have disclosed a positive means for forcing these wedge members 3 into close engagement with the said flattened portions of the said cylindrical tool shank. And in this way I provide a positive clamping means acting in conjunction with the sleeve members, rather than supplemental thereto, for holding the tool shank against rotation within the sleeve.

Figure 5 shows the combination of the improved clamping chuck with a quick-exchange socket. The chuck is practically just the same as that shown in Figure 1 which will become clear at once by comparing the inner members of Figure 5 with Figure 1. 24 is practically the same member as the member 8 in Figure 1, but the power is transmitted to the member 24 not directly, but by the intermediary of a box 26 into which the body 24 is inserted. The upper end of the bolt 28 (practically an equivalent to the bolt 4 of the Figure 1) extends into a cavity provided in the uppermost part of the box 26. This member and the member 24 are coupled with one another by oppositely located pins 27 having rounded ends, of which the inner engage correspondingly shaped cavities in the member 24, and the outer engage longitudinal recesses 30 provided in a sleeve 25 encompassing the box 26. When this sleeve is in the position shown in Figure 5 it bears upon the outer heads of the pins 27 which thereby are retained in their coupling position, as regards the members 26 and 24. But when the member 25 is lifted off the pins, these latter can give way and the member 24 can be withdrawn with all its parts. Disconnecting the tool from the member or chuck body 24 is, with this constructional form, particularly simple in that only the bolt 28 need be pushed downwardly or inwardly by any suitable means or in any suitable manner, for instance by inverting the device and pushing it upon a wooden base by the intermediary of the bolt 28. When a tool, or another tool than that just used, is to be inserted into the member 24, the tool shaft is merely shoved into the transmission sleeve, that is to say, between the segmental pieces 2, and then pressed into it when it will be retained therein by the action and co-operation of the conical faces, just as in the other constructional forms described. Then the chuck is inserted into the box 26 and the sleeve 25 shoved downwardly so as to press the pins 27 inwardly in order to couple the members 26 and 24 with one another, as already described. The diameter of the outer ends of the pins 27 is a little larger than the diameter of the pin body so that the pins cannot fall through into the interior of the box 26. Owing to the pins heads being curved, as shown (the curvature being, preferably, that of a basket handle arch) the pins can be easily shifted by means of the chuck body 24 and the sleeve 25.

The collar 5 of the bolt prevents the segmental pieces 2 from tumbling together inwardly. The conicalness of the segmental pieces, as well as of the bore 7, is very slight, and it is, therefore, possible to exert a very strong clamping pressure with a very small expenditure of force so that sliding of the tool shaft, the transmission sleeve, and the chuck body relatively to one another cannot occur.

The clamping chucks described in the preceding pages and shown, by way of example, on the drawing can be employed in connection with any machine tool. In connection with boring machines they may be used for actuating twist drills, countersinks, and the like; in connection with milling machines they may be used for milling tools of any kind; and in connection with ordinary lathes and turret lathes they may be used for the respective drilling and boring tools. The constructional form shown in Figure 3 is particularly suited for heavy duty work as regards drilling and milling work, in that in this construction the chuck body and the tool shaft are pressed together so strongly that they function as though they were integral.

What I claim:

1. A clamping chuck for tools, comprising, in combination with the body of the chuck, a transmission sleeve adapted to receive the tool or tool shaft in it and consisting of segmental pieces having each a nose-like inwardly directed projection at its inner end, and being shiftable in a conical bore of said body; a bolt arranged co-axially with respect to said sleeve; collars provided on said bolt in such a position that said projections engage the annular groove between them; and wedges arranged between said segmental pieces and adapted to contact with the tool or tool shaft, substantially as described.

2. A clamping chuck for tools, comprising, in combination with the body of the chuck, a transmission sleeve adapted to receive the tool or tool shaft in it and consisting of segmental pieces having each a nose-like inwardly directed projection at its inner end, and being shiftable in a conical bore of said body; a bolt arranged co-axially with respect to said sleeve; collars provided on said bolt in such a position that said projections engage the annular groove between them; grooves along the inner face of said conical bore; and wedges arranged between said segmental seated pieces within said grooves and adapted to contact with the tool or tool shaft upon being shifted positively along said groove.

3. A clamping chuck for tools, comprising, in combination with the body of the chuck, a transmission sleeve adapted to receive the tool or tool shaft in it and consisting of segmental pieces having each a nose-like inwardly directed projection at its inner end, and being shiftable in a conical bore of said body; a bolt arranged co-axially with respect to said sleeve; collars provided on said bolt in such a position that said projections engage the annular groove between them; and a threaded sleeve so arranged as to be adapted to effect the shifting of said transmission sleeve, substantially as set forth.

4. A clamping chuck for tools, comprising, in combination with the body of the chuck, a transmission sleeve adapted to receive the tool or tool shaft in it and consisting of segmental pieces having each a nose-like inwardly directed projection at its inner end, and being shiftable in a conical bore of said body; a bolt arranged co-axially with respect to said sleeve and operatively engaging said projections; a transverse member in the rear end of said bolt; a ring encompassing the chuck body and being engaged by projecting ends of said transverse member; and an internally threaded sleeve enclosing said ring and engaging a corresponding outer screw-thread on the said body, substantially and for the purpose set forth.

5. A clamping chuck for tools having a substantially cylindrical shank including in combination a conically recessed chuck body portion, a plurality of members axially slidable within the recess for clamping said shank substantially throughout its entire cylindrical surface, and auxiliary means positioned between said first mentioned members secured against rotation within the recess for engagement with a non-cylindrical longitudinal peripheral surface portion of the shank upon minute rotation of the latter within the recess.

6. A clamping chuck for tools having a substantially cylindrical shank including in combination a conically recessed chuck body portion, a plurality of members axially slidable within said recess for clamping the tool shank substantially throughout the entire cylindrical surface, means for actuating said slidable means, and means secured against rotation within the recess between said clamping members for positive engagement with a non-cylindrical longitudinal peripheral surface portion of the shank to lock the latter against rotation within the recess.

7. A clamping chuck for tools having a substantially cylindrical shank comprising in combination a conically recessed chuck body, means axially slidable within the recess for clamping said shank substantially throughout its entire cylindrical surface, a second means secured against rotation within the recess and axially slidable into contact with a non-cylindrical peripheral surface portion of the tool shank to lock the latter against rotation within the recess, and independently operable manual means for actuating each of said slidable means.

8. A clamping chuck for tools having a substantially cylindrical shank comprising in combination a recessed chuck body portion, means axially slidable within said recess for clamping said shank substantially throughout its entire cylindrical surface, means adapted to contact said shank longitudinally thereof to lock the latter against rotation within the chuck, and independently operable means for actuating each of said last mentioned means.

9. A clamping chuck for tools including, in combination, a movable clamping device adapted to engage the entire cylindrical portion of a tool shank throughout the major portion of the length, and a wedge member adapted to engage a non-cylindrical portion of the tool shank along substantially the same portion of its length.

10. A tool chuck adapted for use with a tool shank having a cylindrical surface with a flattened portion extending throughout a substantial portion of its length, said chuck including a plurality of clamping segments adapted to engage the cylindrical portion of said shank, and a wedge adapted to engage said flattened surface, said wedge being located between said segments.

11. A tool chuck adapted for use with a tool shank having a cylindrical surface with a flattened portion extending throughout a portion of its length, said chuck including a plurality of clamping segments adapted to engage the cylindrical portion of said shank, and a wedge adapted to engage said flattened surface, said wedge being located between said segments, and seated securely within said chuck.

12. A tool chuck adapted for use with a tool shank having a cylindrical surface with a flattened portion extending throughout a portion of its length, said chuck including a plurality of clamping segments adapted to engage the cylindrical portion of said shank, and a wedge adapted to engage said flattened surface, said wedge being located between said segments and locked against rotation with respect to said chuck.

13. A clamping chuck for tools having a substantially cylindrical shank including in combination a conically recessed chuck body portion, a plurality of members axially slidable within said recess for clamping said shank substantially throughout its entire cylindrical surface, and means positioned between said first mentioned members adapted to engage a substantial portion of the length of said shank to positively lock the same against rotation within the recess.

14. A clamping chuck for tools having a substantially cylindrical shank comprising in combination a conically recessed chuck body portion, a plurality of segmental sleeves axially slidable within the recess and having tapered outer surfaces and parallel inner surfaces, and longitudinally extending wedges seated between said sleeves and adapted to engage a non-cylindrical portion of said shank.

15. A clamping chuck for tools having a substantially cylindrical shank comprising in combination a conically recessed chuck body portion, a plurality of circumferentially spaced segmental sleeves axially slidable within the recess and having tapered outer surfaces and parallel inner surfaces, means for actuating said sleeves, and longitudinally extending means between said spaced segmental sleeves for engaging a non-cylindrical portion of said shank throughout a portion of its length to lock the same against relative rotation.

HEINRICH GÖRG.